Figure 1:
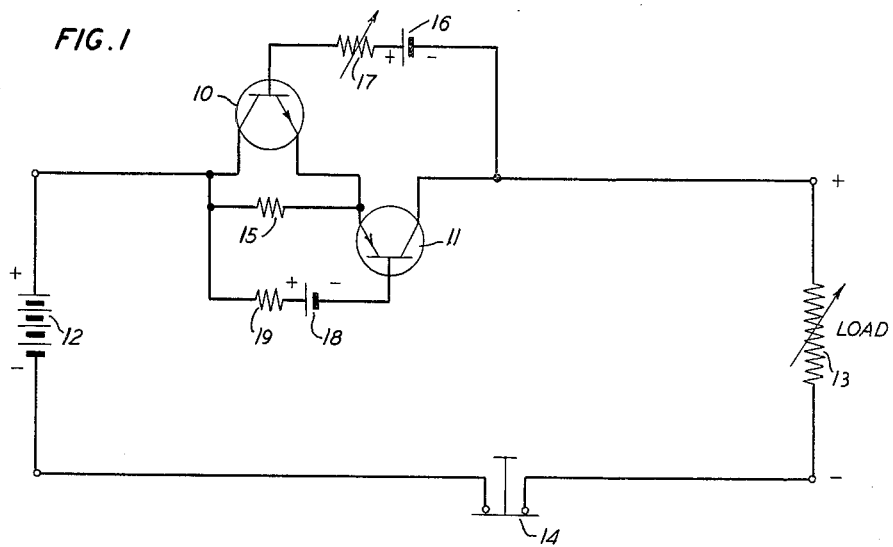

Sept. 28, 1965  E. C. OLSON  3,209,205
CURRENT SUPPLY APPARATUS

Filed June 7, 1960  3 Sheets-Sheet 1

INVENTOR
E. C. OLSON
BY
G. F. Heuerman
ATTORNEY

Sept. 28, 1965     E. C. OLSON     3,209,205
CURRENT SUPPLY APPARATUS
Filed June 7, 1960     3 Sheets-Sheet 2

INVENTOR
E.C. OLSON
BY
G.J. Heuerman
ATTORNEY

Sept. 28, 1965   E. C. OLSON   3,209,205
CURRENT SUPPLY APPARATUS

Filed June 7, 1960   3 Sheets-Sheet 3

INVENTOR
E.C. OLSON

United States Patent Office 3,209,205
Patented Sept. 28, 1965

3,209,205
CURRENT SUPPLY APPARATUS
Everette C. Olson, Columbus, Ohio, assignor, by mesne assignments, to North Electric Company, Galion, Ohio, a corporation of Ohio
Filed June 7, 1960, Ser. No. 34,415
8 Claims. (Cl. 317—33)

This invention relates to current supply apparatus and particularly to apparatus for interrupting a circuit when the current in the circuit reaches a predetermined amplitude.

An object of the invention is to provide improved current interrupting means.

Another object is to provide improved apparatus for protecting a load from excessive current.

Another object is to provide improved apparatus for supplying to a load an intermittent current of a preselected amplitude.

In accordance with a specific embodiment of the invention, herein shown and described for the purpose of illustration, there is provided a current path comprising the emitter-collector paths of a first and a second transistor in series, one of the transistors being of the n-p-n type and the other being of the p-n-p type. Current is supplied to the base-emitter path of the first transistor through the emitter-collector path of the second transistor and current is supplied to the base-emitter path of the second transistor through the emitter-collector path of the first transistor. The base-emitter currents thus supplied to the transistors, respectively, cause the resistance of each of the emitter-collector paths to be maintained at a relatively low value when the current flowing through the emitter-collector paths in series is equal to or less than a predetermined amplitude. When the current through the emitter-collector paths exceeds the predetermined amplitude, the resistance of the emitter-collector paths increases to reduce to a negligibly small amplitude or to substantially interrupt the current through the emitter-collector paths in series.

The current transmitted through the emitter-collector paths of the transistors may be supplied to a load so that the load will be protected from current in excess of a predetermined amplitude. When pulsating current is supplied through the emitter-collector paths in series to a load, the amplitude of the pulses will be limited to a predetermined maximum value. Moreover, means may be provided for interrupting the load current when the amplitude of the pulses exceeds the predetermined maximum value. When the current required to be supplied to the load exceeds the current rating of the first and second transistors, the circuit comprising the first and second transistors may be utilized to control an auxiliary device such as an electromagnetic relay or a third transistor of higher current rating, or several such transistors in parallel, which, in turn, controls the current supplied to the load. If desired, moreover, current may be supplied to a load through a plurality of power transistors in series to reduce the maximum voltage across each of the power transistors and the circuit comprising the first and second transistors may be utilized to control the power transistors so as to limit the current which is supplied to the load. When current from an alternating-current source is supplied to a load, the circuit comprising the first and second transistors may be utilized to periodically vary an impedance in the load circuit to cause the alternating load current to be periodically interrupted.

In a modified embodiment of the invention, instead of connecting the emitter-collector path of an n-p-n type transistor and the emitter-collector path of a p-n-p type transistor in series in a current path which is to be interrupted, the emitter-collector path of a first transistor, of the p-n-p type, for example, is connected in the current path to be interrupted. Current is supplied to the base-emitter path of the first transistor through the emitter-collector path of the second transistor, of the n-p-n type, for example, and a portion of the current supplied through the emitter-collector path of the first transistor is supplied through the base-emitter path of the second transistor. When the current through the emitter-collector path of the first transistor exceeds a predetermined amplitude, the resistance of its emitter-collector path increases from a low to a relatively high value. As a result, the base-emitter current of the second transistor is reduced to cause the resistance of its emitter-collector path to increase from a low to a relatively high value. There is provided a circuit comprising a current source, a resistor, the emitter-collector path of the second transistor and the base-emitter path of the first transistor, all in series. The current in the base-emitter path of the first transistor is thus reduced substantially to zero to cause the emitter-collector current of the first transistor to be reduced to a negligibly small value or to be substantially interrupted.

The invention will now be described in greater detail with reference to the accompanying drawings in which:

FIG. 1 is a schematic view of a current supply circuit embodying the invention; and FIGS. 2, 3, 4, 5 and 6 are schematic views of modifications of the current supply circuit depicted in FIG. 1.

Referring now to FIG. 1 of the drawing, there is provided a circuit comprising an n-p-n type transistor 10 and a p-n-p type transistor 11 for controlling the supply of current from a direct-current source 12 to a load 13 which may vary. Transistor 10 may be a Sylvania 2N102 type and transistor 11 may be a Delco 2N1159 type, for example. Current from the source 12 flows from its positive terminal into the collector and out of the emitter of transistor 10, into the emitter and out of the collector of transistor 11 to the positive load terminal, and from the negative load terminal through a normally closed switch 14 to the negative terminal of the source 12. A resistor 15 of 2250 ohms, for example, is provided in a path connecting the collector and emitter electrodes of transistor 10. The resistor 15 would not be required if the transistors 10 and 11 were a matched pair. The purpose of providing the resistor 15 is to prevent the n-p-n transistor 10 from absorbing too large a portion of the supply voltage when the transistors 10 and 11 are cut off. Resistor 15 thus can determine the voltage division between the transistors 10 and 11. There is provided a circuit connecting the emitter and base electrodes of transistor 10 which comprises the emitter-collector path of transistor 11, a battery or other suitable voltage source 16 and a resistor 17, all in series, the voltage source 16 being poled in a direction to cause current to flow into the base and out of the emitter of transistor 10. The resistor 17 may have a resistance value of 150 ohms and the voltage of the source 16 may be 1.8 volts, for example. There is provided a circuit connecting the base and emitter electrodes of transistor 11 which comprises the emitter-collector path of transistor 10, a voltage source 18 and a resistor 19, all in series, the voltage source 18 being poled in a direction to cause current to flow into the emitter and out of the base of transistor 11.

When the load current supplied from the source 12 through the emitter-collector paths of transistors 10 and 11 in series to the load 13 is equal to or less than a predetermined amplitude, the resistance of the emitter-collector path of each transistor is small, say 0.5 ohm. However, when the load current flowing through the emitter-collector path of transistor 10 exceeds the predetermined amplitude, the resistance of the emitter-collector path of transistor 10 increases to a much higher value, say 250 ohms. For each of a plurality of values of base-emitter current, a characteristic curve may be plotted showing emitter-collector voltages as abscissa and values of emitter-collector current as ordinates. For values of current below a critical value, the rate of change of voltage with respect to current is small, that is, the resistance of the emitter-collector path is small. It will appear from such a curve that there is a saturation region for current values exceeding the critical value where the rate of change of voltage with respect to current is relatively large, that is, the resistance of the emitter-collector path is relatively large. If $\beta_1$ designates the rate of change of current through the emitter-collector path of transistor 10 with respect to the current in the base-emitter path of the transistor in the high resistance or saturated region, then the resistance of the emitter-collector path changes from the low resistance to the relatively high resistance state when the load current flowing through the emitter-collector path of transistor 10 exceeds the product of $\beta_1$ and the base-emitter current of the transistor 10.

It will be assumed that the product of $\beta_2$ for transistor 11 and the ratio of the voltage of source 18 to the resistance of resistor 19 is larger than the product of $\beta_1$ for the transistor 10 and the ratio of the voltage of source 16 to the resistance of resistor 17. Then, when the load current exceeds the product of $\beta_1$ and the ratio of the voltage of source 16 to the resistance of resistor 17, the resistance of the emitter-collector path of transistor 10 will change from a low to a relatively high value and, as a result, the voltage drop across the emitter-collector path of transistor 10 will increase. This increased voltage drop across the emitter-collector path of transistor 10, being opposed to the voltage of the source 18 in the base-emitter circuit of transistor 11, the current flowing into the emitter and out of the base of transistor 11 will decrease. As a result, the load current flowing through the emitter-collector path of transistor 11 will become greater than the product of $\beta_2$ and the current flowing into the emitter and out of the base of transistor 11 to cause the emitter-collector path of transistor 11 to change from a low resistance to a relatively high resistance state. The resulting increased voltage drop across the emitter-collector path of transistor 11, being opposite in polarity to the voltage of the source 16, will reduce substantially to zero the current flowing into the base and out of the emitter of transistor 10, thereby reducing to a negligible value or substantially interrupting the load current. Thereafter, the load current remains interrupted until the base-emitter current of transistor 10 is re-established. This can be accomplished by operating the switch 14 to open and subsequently close the load circuit.

For purpose of illustration, assume that a load current of 0.3 ampere is flowing through the emitter-collector paths of transistors 10 and 11 in series, each emitter-collector path having a resistance of 0.5 ohm. Then the voltage drop across the two emitter-collector paths in series due to the flow of load current will be about 0.3 volt. The voltage between the base of transistor 10 and the collector of transistor 11 will then be slightly less than 0.3 volt, say about 0.25 volt. If the voltage of the source 16 is 1.8 volts and the resistance of resistor 17 is 150 ohms, the current flowing in the base-emitter path of transistor 10 would be equal to 1.55 volts divided by 150 ohms or approximately 10 milliamperes. It may be found, for example, that for a base-emitter current of 10 milliamperes, the resistance of the emitter-collector path of transistor 10 changes from a low value of about 0.5 ohm to a high value of about 250 ohms when the emitter-collector current increases to about 0.35 ampere. Under these conditions, the protection circuit will operate to interrupt the load current when it reaches a predetermined amplitude, say 0.35 ampere. The value of the load current which causes the circuit to be interrupted may be selected by varying the voltage of the source 16 or the resistance of the resistor 17. For example, an increase of the voltage of source 16 or a decrease of the resistance of resistor 17 would result in a higher base-emitter current and consequently a higher value of load current at which the protection circuit would trigger to interrupt the load current.

The circuits shown in FIGS. 2, 3, 4 and 5 are similar in certain respects to the circuit of FIG. 1. To avoid repetition, therefore, the elements of FIGS. 2, 3, 4 and 5 which correspond to the elements shown in FIG. 1 are designated by the same numerals.

Figure 2:
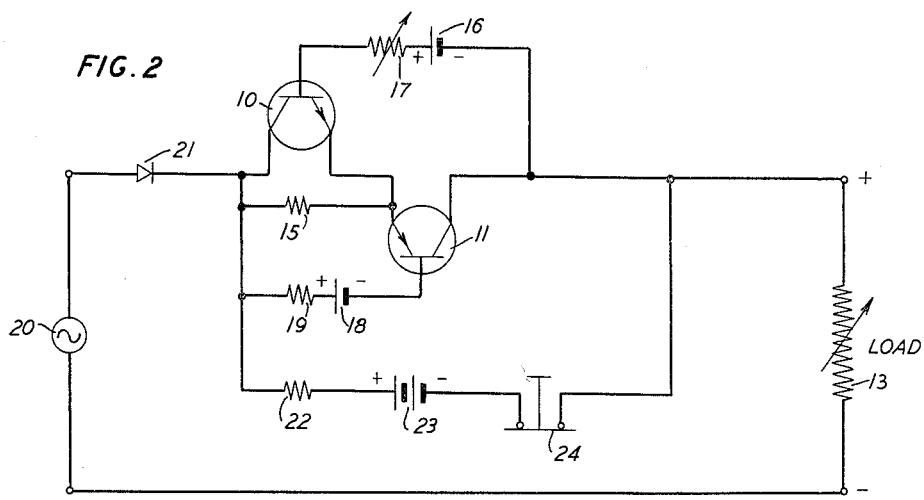

The circuit of FIG. 2 differs from the circuit of FIG. 1 in that there are provided an alternating-current supply source 20 and a rectifying element 21 for supplying through the protective circuit comprising transistors 10 and 11 a pulsating current to the load 13. There is also provided a current path comprising a resistor 22 of relatively large resistance, a direct voltage source 23 and a switch 24, all in series, connecting the collector of transistor 10 to the collector of transistor 11. The polarity of the voltage source 23 is opposed to the voltage pulses supplied by the source 20 and rectifier 21. The voltage of the source 23 is larger than the voltage of the pulses supplied by the source 20 and rectifier 21.

When the switch 24 is open, current pulses of one polarity, positive, for example, will be transmitted from the source 20, through the rectifying element 21 and the protection circuit to the load 13. The protection circuit comprising transistors 10 and 11 will open the load circuit when the load current exceeds a predetermined amplitude during each positive half cycle period of the source 20. At the start of the following negative half cycle period, however, the base-emitter current of transistor 10 is re-established so that the succeeding positive half cycle pulse from source 20 and rectifier 21 is transmitted to the load. Thus there are transmitted to the load a series of pulses having a maximum amplitude substantially equal to the current amplitude at which the circuit comprising transistors 10 and 11 interrupts the load circuit.

Figure 3:
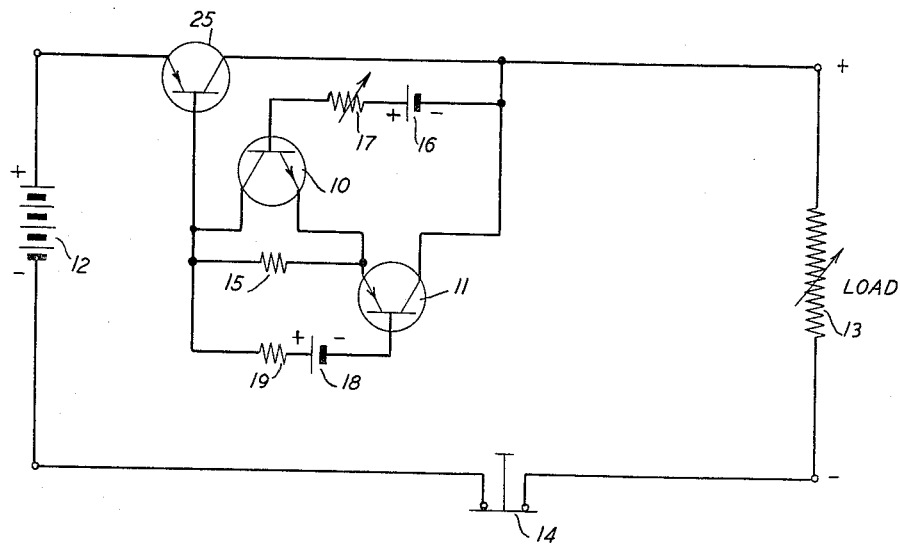

When switch 24 is closed, the voltage of the source 23 will maintain the relatively large voltage drops across the emitter-collector paths of transistors 10 and 11 during each negative half cycle of the source 20 following a positive half cycle during which the protective circuit has interrupted the load current. Thus, with the switch 24 initially closed, the protection circuit will interrupt the load circuit in response to a load current impulse of excessive amplitude and the load circuit will subsequently remain interrupted until the switch 24 is manually opened and reclosed.

Where it is desired to supply to a load current of larger amplitude than can be transmitted through the emitter-collector paths of transistors 10 and 11 of FIGS. 1 and 2 without damaging the transistors, the protective circuit comprising transistors 10 and 11 may be utilized to control an auxiliary device such as an electromagnetic relay, a power transistor or a plurality of such transistors connected in parallel. Such an arrangement is shown in FIG. 3. In this embodiment of the invention, there is provided a power transistor 25 of the p-n-p type. The emitter of transistor 25 is connected to the positive terminal of the direct-current supply source 12 and its collector is connected to the positive load terminal. The collector of transistor 10 is connected to the base of transistor 25 and the collector of transistor 11 is connected to the positive load terminal.

It will be observed that current is supplied from the source 12 through the emitter-collector path of transistor 25 to the load 13. Current from source 12 is also supplied to a second circuit comprising the base-emitter path of transistor 25, the emitter-collector paths of transistors 10 and 11, respectively, and the load 13, all in series. When the current in the second circuit exceeds a predetermined amplitude due to a decrease of the load resistance, for example, the protection circuit comprising transistors 10 and 11 will cause the current in the second circuit to be interrupted. In response to the interruption of this current flowing through the base-emitter path of transistor 25, the current supplied through the emitter-collector path of transistor 25 to the load will also be interrupted. As in the embodiment shown in FIG. 1, the circuit may be reconditioned for supplying current to the load by manually opening and reclosing the switch 14.

It will be noted in FIG. 3 that when the transistor 25 is cut off, substantially the entire voltage of the source 12 appears across the emitter-collector path of transistor 25. Where the required voltage of source 12 is sufficiently high to damage a power transistor, there may be provided a plurality of power transistors having their emitter-collector paths in series with each other and with the supply source and the load. Such an arrangement is depicted in FIG. 4.

Figure 4:
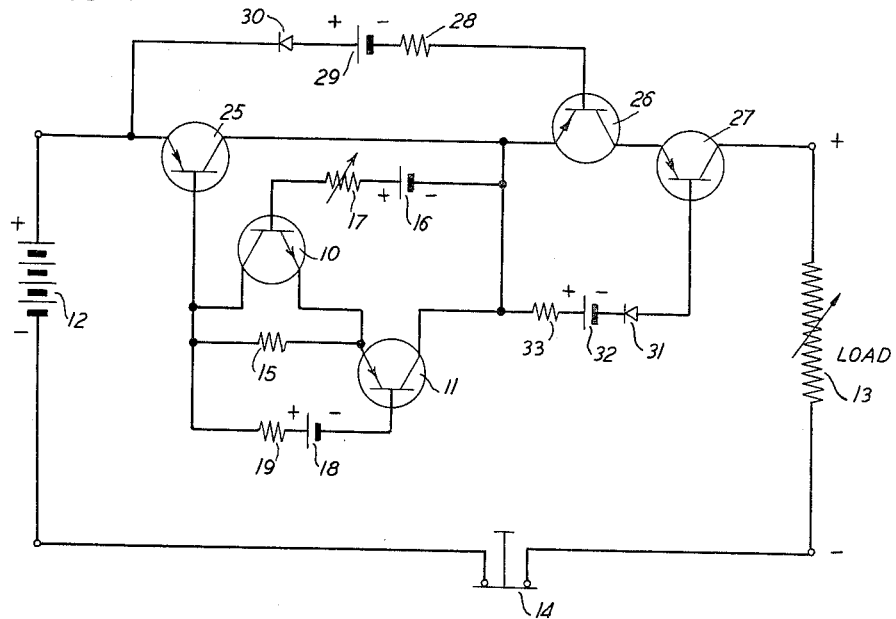

In FIG. 4 there are provided three power transistors 25, 26 and 27, each of the p-n-p type. The emitter of transistor 25 is connected to the positive terminal of the supply source 12, the collector of transistor 25 is connected to the emitter of transistor 26, the collector of transistor 26 is connected to the emitter of transistor 27 and the collector of transistor 27 is connected to the positive load terminal. The circuit comprising transistors 10 and 11 is connected to the base and collector electrodes of transistor 25, as in FIG. 3. There is provided a current path connectnig the base of transistor 26 and the emitter of transistor 25 comprising a resistor 28, a voltage source 29 and a rectifying element 30, all in series. The voltage source 29 and the rectifying element 30 are poled in a direction to cause current flow into the emitter and out of the collector of transistor 25 and into the emitter and out of the base of transistor 26. A current path connecting the base of transistor 27 and the emitter of transistor 26 comprises in series a rectifying element 31, a voltage source 32 and a resistor 33, all in series. The voltage source 32 and the rectifying element 31 are poled in a direction to cause current flow into the emitter and out of the collector of transistor 26 and into the emitter and out of the base of transistor 27.

When the current flowing from source 12 over a series path including the base-emitter path of transistor 25, the emitter-collector path of transistor 10 and the emitter-collector path of transistor 11, increases to an excessive value, the resistance of the emitter-collector paths of transistors 10 and 11 changes from a low to a relatively high value to reduce the base-emitter current of transistor 25 and to cause the resistance of the emitter-collector path of transistor 25 to increase to a relatively high value. The resulting increase of voltage drop across the emitter-collector path of transistor 25 causes a reduction of the current flowing into the emitter and out of the base of transistor 26 to thereby cause the resistance of the emitter-collector path of transistor 26 to increase from a low to a relatively high value. The increased voltage drop across the emitter-collector path of transistor 26, being in opposition to the voltage of the source 32, reduces the current flowing into the emitter and out of the base of transistor 27 substantially to zero to cause the load current flowing through the emitter-collector paths of transistors 25, 26 and 27 to be interrupted.

Figure 5:
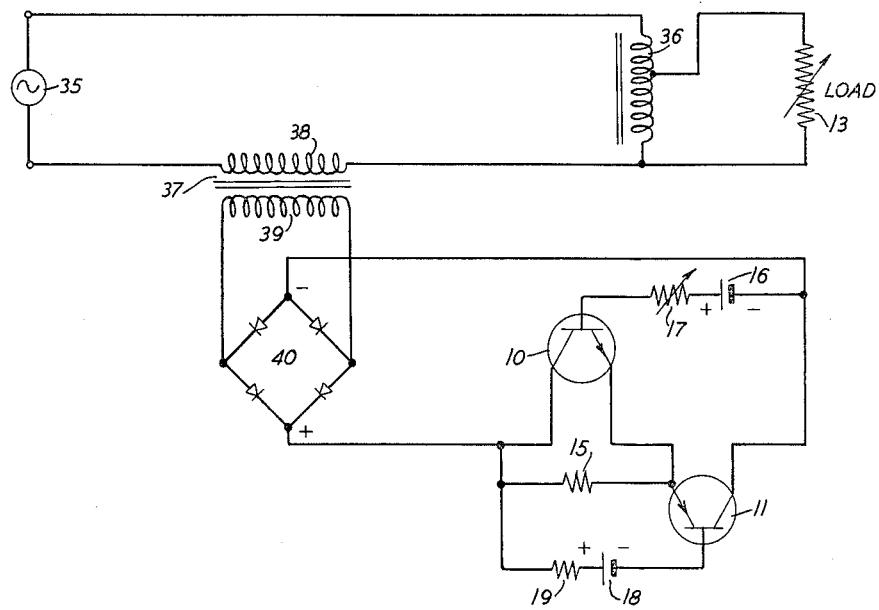

In FIG. 5, alternating current from an alternating-current supply source 35 is supplied to a load 13 through a circuit comprising an autotransformer 36 and a transformer 37 having a primary winding 38 and a secondary winding 39, the primary of autotransformer 36 and the primary transformer winding 38 being connected in series. There is provided a bridge rectifier 40 having its input connected to the secondary transformer winding 39. The positive output terminal of rectifier 40 is connected to the collector of transistor 10 and the negative output terminal of rectifier 40 is connected to the collector of transistor 11. Current thus flows from the positive terminal of rectifier 40 into the collector and out of the emitter of transistor 10, into the emitter and out of the collector of transistor 11 to the negative terminal of the rectifier.

When the amplitude of the alternating current supplied from the source 35 through the primary winding 38 is relatively low, the impedance of winding 38 is relatively low. However, if during a half cycle period of the alternating current the current flowing through winding 38 exceeds a predetermined amplitude, the circuit comprising transistors 10 and 11 functions to interrupt the current in the circuit connected to the output terminals of rectifier 40. As a result the impedance of winding 38 increases to reduce or substantially interrupt the current supplied through winding 38 to the load. Similarly, the amplitude of succeeding alternately negative and positive current pulses will be reduced when a predetermined current amplitude is exceeded. If desired, a clamping circuit comprising the resistor 22, voltage source 23 and switch 24 connected to the collectors, respectively, of transistors 10 and 11, as shown in FIG. 2, may be added to the circuit of FIG. 5. In this case, when a predetermined amplitude of load current flowing through winding 38 is exceeded, the winding 38 will thereafter remain in the high impedance state to substantially block the load current until the switch 24 is opened and reclosed.

Figure 6:
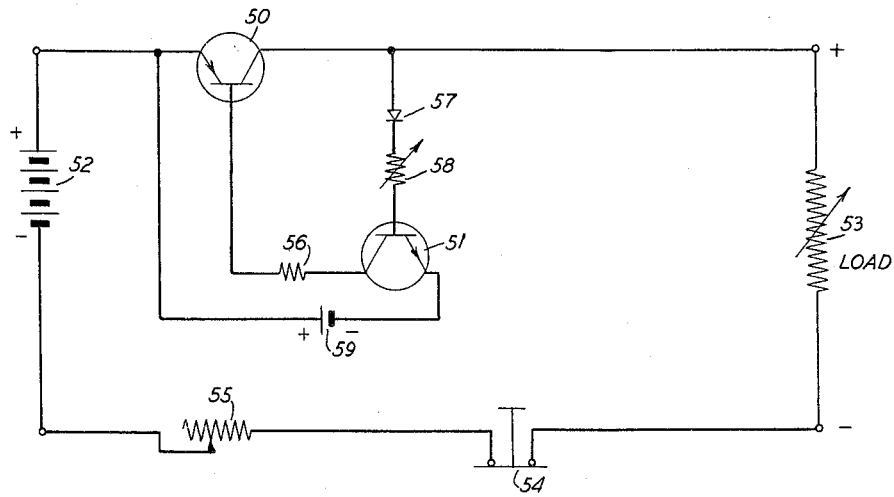

The embodiment of the invention shown in FIG. 6 is in some respects preferable to the circuit shown in FIG. 1. An advantage of the circuit of FIG. 6 is that only a single auxiliary voltage source is required while the circuit of FIG. 1 requires two auxiliary voltage sources 16 and 18. In FIG. 6, current from a direct-current source 52 is supplied to a circuit comprising the emitter-collector path of a p-n-p type power transistor 50 to the positive terminal of a load 53, and from the negative load terminal through a normally closed switch 54 and a rheostat 55, all in series. The transistor 50 may be a 2N174 type, for example. There is provided a transistor 51 of the n-p-n type having its collector connected through a resistor 56 of 10 ohms, for example, to the base electrode of transistor 50. The base of transistor 51 is connected to the positive load terminal through a current path comprising a rectifying element 57 and a variable resistor 58 of 200 ohms, for example. An auxiliary voltage source 59 is provided in a path connecting the emitter of transistor 51 to the emitter of transistor 50. The voltage source 59 and rectifying element 57 are poled in a direction to cause current to flow into the emitter and out of the collector of transistor 50, through rectifying element 57 and resistor 58, into the base and out of the emitter of transistor 51. Current from the source 59 will also flow into the emitter and out of the base of transistor 50, through resistor 56 and into the collector and out of the emitter of transistor 51.

The operation of the circuit of FIG. 6 is similar to the operation of the circuit of FIG. 1 and FIGS. 2, 3, 4 and 5 may be modified in accordance with the disclosure of FIG. 6. The circuit comprising transistors 50 and 51 may be substituted for the circuit comprising transistors 10 and 11 of FIGS. 2 and 5 and for the circuit portion comprising transistors 25, 10 and 11 of FIGS. 3 and 4. When the load current flowing through the emitter-collector path of transistor 50 exceeds a predetermined amplitude, the resistance of the emitter-collector path will increase rapidly with increase of load current. The resulting increased voltage drop across the emitter-collector path of transistor 50, being in opposition to the voltage of the source 59, will cause the current in the base-emitter path of transistor 51 to decrease rapidly to zero. The reduction of the base-emitter current of transistor 51 will increase the resistance of its emitter-collector path to cause the current flowing through the base-emitter path of transistor 50 to decrease to zero, thereby interrupting the load current flowing through the emitter-collector path of transistor 50. The load current will remain interrupted until the load circuit is opened and reclosed by the operation of the switch 54. It will be noted that in the circuit of FIG. 6 the load current does not pass through the emitter-collector path of the n-p-n transistor 51, while in FIG. 1 the load current passes through the emitter-collector path of both transistors 10 and 11. This is a distinct advantage since at present p-n-p transistors are available in much higher current ratings than are n-p-n type transistors. It will also be noted that the reverse resistance of rectifying element 57 protects the transistor 51 from excess voltage when the transistor 50 interrupts the load current.

It will be noted that current flows into the collector and base electrodes and out of the emitter electrode of n-p-n transistor 10, for example, while in the case of p-n-p transistor 11, for example, current flows into the emitted and out of the base and collector electrodes. As the terms are used herein, emitter-base, base-emitter, and emitter-collector and collector-emitter may refer to the current paths in either the p-n-p or the n-p-n type transistor.

What is claimed is:

1. Apparatus for supplying current to a load comprising a pair of transistors of the p-n-p and n-p-n types respectively, first means for transmitting current through a first circuit comprising the emitter-collector path of said first transistor and the base-emitter path of said second transistor in series, second means for transmitting current through a second circuit comprising the emitter-collector path of said second transistor and the base-emitter path of the first transistor in series, and path means including the emitter-collector paths of said first and second transistors connected in series to transmit the current from a source to a load, said transistors being operative to substantially interrupt said current flow to said load responsive to flow of current in excess of said predetermined amplitude over said series emitter-collector paths.

2. An apparatus as set forth in claim 1 in which said load includes an auxiliary switching device connected to be turned on and off by said pair of transistors.

3. In combination, a pair of transistors of the p-n-p and n-p-n types respectively, a first, a second and a third current source, a first circuit comprising said first current source and the emitter-collector path of a first of said transistors, a second circuit comprising said second current source only, the emitter-collector path of said first transistor and the base-emitter path of said second transistor all in series, and a third circuit comprising said third current source only, the base-emitter path of said first transistor and the emitter-collector path of said second transistor all in series.

4. In combination, a pair of transistors of the p-n-p and n-p-n types respectively, means for supplying current from a first source to a first circuit comprising the emitter-collector paths of said transistors in series, a first and a second resistor, a second and a third current source, a second circuit comprising said second current source, said first resistor, the base-emitter path of a first of said transistors and the emitter-collector path of the second of said transistors all in series, and a third circuit comprising said third current source, said second resistor, the base-emitter path of said second transistor and the emitter-collector path of said first transistor all in series.

5. Apparatus for supplying current from a first direct voltage source to a load comprising a first transistor of the n-p-n type, a second transistor of the p-n-p type, means for connecting the emitter-collector paths of said transistors in series with each other and in series with said load, a first resistor, a second direct voltage source, means for supplying current from said second source through said first resistor and the emitter-collector path of said first transistor in series to the base-emitter path of said second transistor, a second resistor, a third direct voltage source, and means for supplying current from said third voltage source through said second resistor and the emitter-collector path of said second transistor in series to the base-emitter path of said first transistor.

6. Apparatus for supplying current from a current supply source to a load comprising a first transistor of the p-n-p type having its emitter-collector path connected in series with said supply source and said load, a second transistor of the n-p-n type, a third transistor of the p-n-p type, means for connecting the collector of said second transistor to the base of said first transistor, means for connecting the collector of said third transistor to the collector of said first transistor, means for supplying current through the emitter-collector path of said second transistor to the base-emitter path of said third transistor, and means for supplying current through the emitter-collector path of said third transistor to the base-emitter path of said second transistor.

7. In combination, a first and a second transistor of the p-n-p type, a third transistor of the n-p-n type, a fourth transistor of the p-n-p type, means for transmitting current from a current supply source through the emitter-collector paths of said first and second transistors in series to a load, means for supplying current to a circuit comprising the base-emitter path of said first transistor and the emitter-collector paths of said third and fourth transistors all in series, means for connecting the collector of said fourth transistor to the collector of said first transistor, means for supplying current to a circuit comprising the base-emitter path of said third transistor and the emitter-collector path of said fourth transistor in series, means for supplying current to a circuit comprising the base-emitter path of said fourth transistor and the emitter-collector path of said third transistor in series, and means for supplying current to a circuit comprising the base-emitter path of said second transistor and the emitter-collector path of said first transistor in series.

8. In combination, a transformer having a primary and a secondary, means for transmitting current from an alternating-current supply source through said primary to a load, a rectifier having a pair of input terminals connected to said secondary and a pair of output terminals, a first transistor of the p-n-p type, a second transistor of the n-p-n type, a circuit connected to said output terminals comprising the emitter-collector paths of said first and second transistors in series, means for supplying current through the emitter-collector path of said second transistor to the base-emitter path of said first transistor, and means for supplying current through the emitter-collector path of said first transistor to the base-emitter path of said second transistor, said first and second transistors being operative to substantially effect interruption of the flow of current from said source to said load responsive to a current flow in excess of a predetermined amplitude over said series emitter-collector paths to said output terminals.

References Cited by the Examiner

UNITED STATES PATENTS

| | | | |
|---|---|---|---|
| 2,769,907 | 11/56 | Lohman | 307—88.5 |
| 2,832,900 | 4/58 | Ford | 317—51 |
| 2,853,633 | 9/58 | McVey | 307—88.5 |
| 2,864,062 | 12/58 | Schaffner | 307—88.5 |
| 2,890,353 | 6/59 | Van Overbeck et al. | 317—51 |
| 2,904,742 | 9/59 | Chase | 323—22 |
| 2,922,945 | 1/60 | Norris et al. | 323—22 |

FOREIGN PATENTS 1,160,405   3/58   France.

LLOYD McCOLLUM, *Primary Examiner.*

SAMUEL BERNSTEIN, *Examiner.*